United States Patent [19]

Garbutt

[11] Patent Number: 4,543,667
[45] Date of Patent: Oct. 1, 1985

[54] SUN VISOR

[76] Inventor: Valerie Garbutt, 762 E. Fairview Ave., Annapolis, Md. 21403

[21] Appl. No.: 651,960

[22] Filed: Sep. 19, 1984

[51] Int. Cl.[4] .............................................. A61F 9/04
[52] U.S. Cl. ......................................................... 2/13
[58] Field of Search .................. 2/12, 13, 141 A, 142, 2/274, 178, 222; 351/155, 156, 157, 158

[56] References Cited

U.S. PATENT DOCUMENTS

| | | | |
|---|---|---|---|
| 542,015 | 7/1895 | Goodman | 2/13 |
| 593,077 | 11/1897 | Bevan | 2/12 |
| 947,636 | 1/1910 | Degges . | |
| 1,471,967 | 10/1923 | Mahlmann . | |
| 2,541,242 | 2/1951 | Grove . | |
| 2,724,834 | 11/1955 | Henderson et al. . | |
| 2,762,050 | 9/1956 | Bricker | 2/13 |
| 2,795,793 | 6/1957 | Sommers | 2/13 |
| 3,011,170 | 12/1961 | Lutz . | |
| 3,128,474 | 4/1964 | Feldman | 2/12 |
| 3,237,204 | 3/1966 | Honsaker . | |
| 3,276,035 | 10/1966 | Jacobson . | |

Primary Examiner—Louis K. Rimrodt
Assistant Examiner—Joseph S. Machuga
Attorney, Agent, or Firm—Schwartz, Jeffery, Schwaab, Mack, Blumenthal & Evans

[57] ABSTRACT

A sun visor for attachment to a pair of eyeglass temples includes a bill member having a substantially flat, rigid stiffening member formed with a substantially concave inner edge and a substantially convex outer edge. A top and a bottom material covers the top and bottom surfaces of the rigid stiffening member and has generally the same shape as the stiffening member. An outer ribbon of material is folded over the outer edges of the bill member and the top and bottom material and is secured thereto. A pair of loops of elastic material are stitched between the ribbon and the bottom material on the underside of the bill adjacent the sides where the edges meet.

2 Claims, 5 Drawing Figures

SUN VISOR

BACKGROUND OF THE INVENTION

1. Field of the Invention

The invention relates to sun visors, and more particularly to sun visors adapted to be attached to a pair of eyeglasses.

2. Prior Art

Numerous attempts have been made to provide sun visors, eye shades and the like for use with eyeglasses. Examples of these are as follows: Goodman, U.S. Pat. No. 542,015; Degges, U.S. Pat. No. 947,636; Mahlmann, U.S. Pat. No. 1,471,967; Grove, U.S. Pat. No. 2,541,242; Henderson et al, U.S. Pat. No. 2,724,834; Bricker, U.S. Pat. No. 2,762,050; Sommers, U.S. Pat. No. 2,795,793; Lutz, U.S. Pat. No. 3,011,170; Honsaker, U.S. Pat. No. 3,237,204; and Jacobson, U.S. Pat. No. 3,276,035.

These prior art eye shades or sun visors have been made of various types of material and have had various means for attaching the shade to eyeglasses. Several of these prior art eye shades, for example as illustrated in U.S. Pat. Nos. 2,541,242, 2,762,050 and 2,795,793, have had various types of straps, elastic thread or plastic loops for retaining the eye shade to the glasses of the wearer. Because of the way the prior art attachment means have been mounted, the eye shade/visor can easily become separated from the loop, particularly during active use by the wearer and by repeated attachment and removal of the eye shade to the eyeglasses.

OBJECTS AND SUMMARY OF THE INVENTION

It is an object of the instant invention to provide a sun visor for attachment to a pair of sunglasses or the like wherein the visor includes durable attachment means.

Another object of the invention is to provide double elastic loops on the underside of a sun visor, the loops maintaining the visor stationary relative to the eyeglasses, and further inhibiting the visor from flying up during active use.

Still another object of the invention is to provide a double elastic loop on the underside of a visor thereby providing a back-up system if one loop should tear.

Yet another object is to provide a pair of loops on each side edge of a sun visor such that it can be attached to eyeglass temples, whether the temples are positioned high or low on the lenses.

A sun visor for attachment to a pair of eyeglass temples includes a bill member having a substantially flat, rigid stiffening member formed with a substantially concave inner edge and a substantially convex outer edge. A top and a bottom material coves the top and bottom surfaces of the rigid stiffening member and has generally the same shape as the stiffening member. An outer ribbon of material is folded over the outer edges of the bill member and the top and bottom material and is secured thereto. A pair of loops of elastic material are stitched between the ribbon and the bottom material on the underside of the bill adjacent the sides where the edges meet.

BRIEF DESCRIPTION OF THE DRAWINGS

The above and other objects of the invention will become more readily apparent from the following description and accompanying drawings wherein.

DETAILED DESCRIPTION OF THE INVENTION

Figure 1:
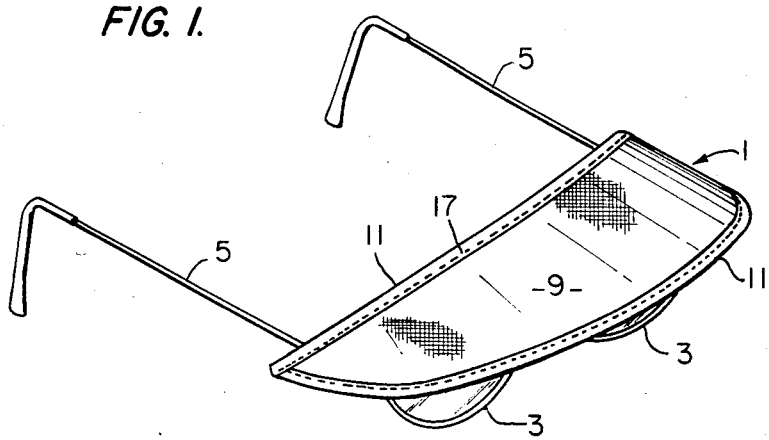
FIG. 1 is a perspective view of a sun visor according to the instant invention wherein the sun visor is seen attached to a pair of glasses.
Figure 2A:
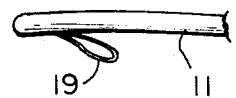
FIG. 2a is a partial side elevation view showing an end and locking through one pair of loops.
Figure 2:
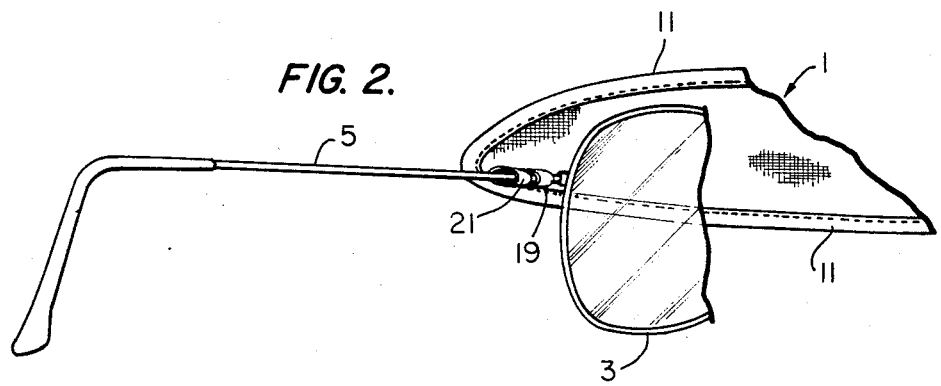
FIG. 2 is a partial rear elevation view showing the sun visor mounted on a temple side member.
Figure 3:
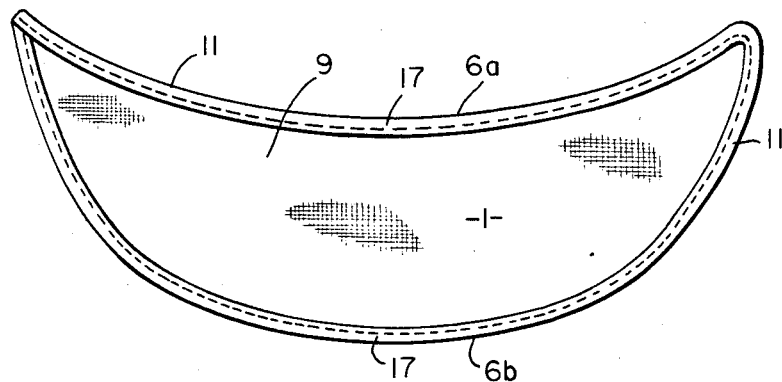
FIG. 3 is a top plan view of the sun visor.
Figure 4:
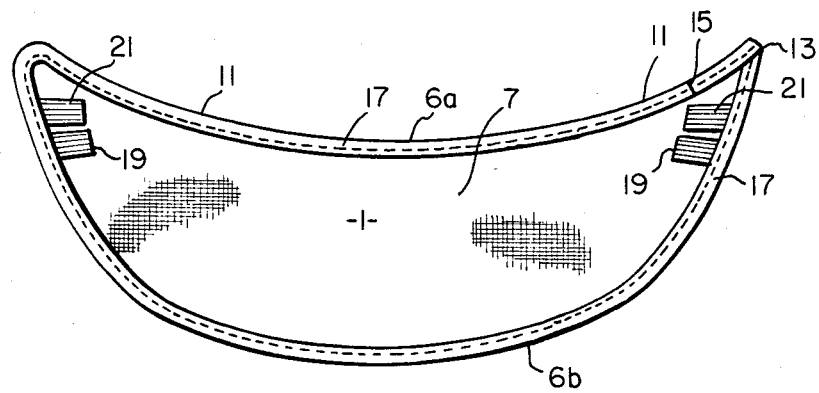
FIG. 4 is a bottom plan view of the sun visor.

A sun visor in the form of a hat bill 1 is seen mounted on a pair of eyeglasses having a pair of lenses 3 and a pair of side temple elements 5. The bill 1 has an inner concave surface or edge 6a and an outer convex edge 6b as seen in FIGS. 3 and 4.

The visor 1 is constructed with an inner substantially flat, rigid stiffening member of cardboard or the like (not shown) and an underside covering of cloth material 7 and a top covering of cloth material 9. A one-piece ribbon border 11 is folded around the edge of the visor beginning at point 13 and ending at point 15 as seen in FIG. 4. The border is stitched, both top and bottom as seen by the dashed lines 17 in the drawings.

Stitched between the border 11 and the underside covering of the visor cloth are a pair of forward elastic loops 19 and a pair of rearward elastic loops 21. The elastic loops are about $\frac{1}{4}$" wide and extend out about 3/8" to $\frac{1}{2}$" from the edge.

As stated above, by the provision of the two elastic loops, the visor will fit any type of glasses, whether the temple members 5 are attached high or low with relation to the lenses 3. The double loops will also assist the visor in remaining stationary relative to the glasses, i.e., inhibiting the visor from "flying up" during active use. Further, the provision of loops 19 and 21 is advantageous in the event that one of the loops should tear loose, the other loop will retain the visor on the glasses.

In use, the loop 19 and then the loop 21 on one side of the visor are slid over the temple member 5. The procedure is repeated with regard to the other loops 19 and 21 relative to the temple member 5 on the other side.

While one embodiment of the invention has been described, it will be understood that it is capable of further modification, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A sun visor for attachment to a pair of eyeglasses, comprising:
   (a) a bill member having a substantially flat, rigid stiffening member and being formed with a substantially concave inner edge and a substantially convex outer edge, said edges meeting at each side of the bill;
   (b) a top and a bottom material covering the top and bottom surfaces of said rigid stiffening member and having generally the same shape as said rigid stiffening member;

(c) an outer ribbon of material folded over the outer edges of said bill member and being secured thereto;
(d) the improvement comprising: a pair of loops of elastic material independently mounted between said ribbon and said bottom material on the underside of said bill adjacent said sides where said edges meet; and said outer ribbon being stitched with thread to said bill and said loops are stitched to said bill between said ribbon and bottom material.

2. A sun visor as defined in claim 1 wherein said material is cloth.

* * * * *